US010250666B2

(12) United States Patent
Sheflin

(10) Patent No.: US 10,250,666 B2
(45) Date of Patent: Apr. 2, 2019

(54) SYSTEMS AND METHODS FOR DASHBOARD IMAGE GENERATION

(71) Applicant: Dundas Data Visualization, Inc., Toronto (CA)

(72) Inventor: Terrence Eugene Sheflin, Brampton (CA)

(73) Assignee: Dundas Data Visualization, Inc., Toronto (CA)

( * ) Notice: Subject to any disclaimer, the term of this patent is extended or adjusted under 35 U.S.C. 154(b) by 337 days.

(21) Appl. No.: 14/918,170

(22) Filed: Oct. 20, 2015

(65) Prior Publication Data
US 2016/0072871 A1    Mar. 10, 2016

Related U.S. Application Data

(63) Continuation of application No. 13/267,955, filed on Oct. 7, 2011.
(Continued)

(51) Int. Cl.
*G06F 17/30* (2006.01)
*H04L 29/08* (2006.01)
(Continued)

(52) U.S. Cl.
CPC ............ *H04L 67/02* (2013.01); *G06F 3/0484* (2013.01); *G06F 17/30268* (2013.01);
(Continued)

(58) Field of Classification Search
CPC ... G06F 3/0481; G06F 17/246; G06F 11/3616
See application file for complete search history.

(56) References Cited

U.S. PATENT DOCUMENTS 6,088,691 A    7/2000 Bhargava et al.
6,289,462 B1   9/2001 McNabb et al.
(Continued)

OTHER PUBLICATIONS

Prosecution Documents relating to U.S. Appl. No. 12/552,595 / Publication No. 2010/0058466 (1st Office Action, Response, Final Office Action and Notice of Abandonment dated Jun. 6, 2012).
(Continued)

*Primary Examiner* — Andrew R Dyer
(74) *Attorney, Agent, or Firm* — Bereskin & Parr LLP/S.E.N.C.R.L., s.r.l.

(57) ABSTRACT

Systems and methods for generating a dashboard image for viewing on a remote computing device. The system may include a business database storing a plurality of business values; a dashboard generator; an image generator and a web page generator. The dashboard generator may be configured to derive a plurality of key performance indicator values from the business database and generate a dashboard corresponding to the plurality of key performance indicator values. The image generator may be configured to generate the dashboard image, such that the dashboard image corresponds to the dashboard. As well, the web page generator may be operatively coupled to the image generator and configured to generate a dashboard web page corresponding to the dashboard image. The method may include: receiving a dashboard image request from the remote computing device; deriving a plurality of key performance indicator values from a business database; creating a dashboard image corresponding to the key performance indicator values; and generating a dashboard web page corresponding to the dashboard image.

19 Claims, 6 Drawing Sheets

Related U.S. Application Data

(60) Provisional application No. 61/390,642, filed on Oct. 7, 2010.

(51) Int. Cl.
  *G06Q 10/06* (2012.01)
  *G06F 3/0484* (2013.01)
  *G06T 1/00* (2006.01)

(52) U.S. Cl.
  CPC ........... *G06Q 10/06* (2013.01); *G06T 1/0007* (2013.01); *Y04S 10/54* (2013.01)

(56) References Cited

U.S. PATENT DOCUMENTS

| | | | |
|---|---|---|---|
| 6,448,958 B1 | 9/2002 | Muta | |
| 7,114,007 B2 | 9/2006 | Sasaki | |
| 7,565,683 B1 | 7/2009 | Huang et al. | |
| 7,669,244 B2 | 2/2010 | Smith | |
| 7,797,676 B2 | 9/2010 | Agapi et al. | |
| 7,805,349 B2* | 9/2010 | Yu | G06Q 40/10 705/36 T |
| 7,818,681 B2* | 10/2010 | Abuelsaad | G06F 9/44536 715/760 |
| 7,822,662 B2 | 10/2010 | Guzik et al. | |
| 7,900,139 B2 | 3/2011 | Hosotsubo | |
| 7,958,120 B2 | 6/2011 | Muntz et al. | |
| 8,261,181 B2 | 9/2012 | Tien et al. | |
| 8,392,877 B1 | 3/2013 | Chiluvuri | |
| 8,423,494 B2 | 4/2013 | Barrett et al. | |
| 8,429,151 B2 | 4/2013 | Nica et al. | |
| 8,683,370 B2 | 3/2014 | Marchand et al. | |
| 8,954,524 B1* | 2/2015 | Hamon | G06Q 30/00 705/14.53 |
| 9,734,136 B1* | 8/2017 | Mody | G06F 17/30905 |
| 2003/0227461 A1* | 12/2003 | Hux | G06T 11/40 345/543 |
| 2003/0236732 A1 | 12/2003 | Cimral et al. | |
| 2004/0001092 A1 | 1/2004 | Rothwein et al. | |
| 2004/0133536 A1 | 7/2004 | Uceda-Sosa | |
| 2004/0208370 A1 | 10/2004 | Whatmough | |
| 2005/0027871 A1 | 2/2005 | Bradley et al. | |
| 2005/0050315 A1 | 3/2005 | Burkhardt et al. | |
| 2005/0071737 A1 | 3/2005 | Adendorff et al. | |
| 2005/0091241 A1 | 4/2005 | Mills, III et al. | |
| 2005/0216831 A1 | 9/2005 | Guzik et al. | |
| 2005/0240467 A1 | 10/2005 | Eckart et al. | |
| 2005/0246444 A1* | 11/2005 | Koehane | G06F 17/30905 709/227 |
| 2006/0010164 A1 | 1/2006 | Netz et al. | |
| 2006/0031182 A1 | 2/2006 | Ryan et al. | |
| 2006/0212791 A1 | 9/2006 | Crow et al. | |
| 2006/0259629 A1 | 11/2006 | Usmani et al. | |
| 2006/0271846 A1* | 11/2006 | Nickolov | G06Q 10/10 715/235 |
| 2007/0024889 A1* | 2/2007 | Eldridge | G06F 3/1218 358/1.14 |
| 2007/0088731 A1 | 4/2007 | Chant et al. | |
| 2007/0106643 A1 | 5/2007 | Croft et al. | |
| 2007/0180519 A1 | 8/2007 | Boccon-Gibod et al. | |
| 2007/0226314 A1 | 9/2007 | Eick et al. | |
| 2007/0234198 A1 | 10/2007 | Tien et al. | |
| 2007/0245238 A1 | 10/2007 | Fugitt et al. | |
| 2008/0010233 A1 | 1/2008 | Sack et al. | |
| 2008/0059441 A1 | 3/2008 | Gaug et al. | |
| 2008/0115103 A1 | 5/2008 | Datars et al. | |
| 2008/0127052 A1 | 5/2008 | Rostoker | |
| 2008/0229213 A1 | 9/2008 | Hamilton et al. | |
| 2008/0256439 A1 | 10/2008 | Boreham et al. | |
| 2008/0256440 A1 | 10/2008 | Boreham et al. | |
| 2008/0294680 A1 | 11/2008 | Powell et al. | |
| 2009/0055724 A1 | 2/2009 | Van ham et al. | |
| 2009/0157447 A1 | 6/2009 | Busch | |
| 2009/0187845 A1 | 7/2009 | Middelfart | |
| 2009/0217150 A1 | 8/2009 | Lin | |
| 2009/0265654 A1 | 10/2009 | Dieberger et al. | |
| 2010/0058466 A1 | 3/2010 | Marchand et al. | |
| 2010/0100562 A1 | 4/2010 | Millsap | |
| 2010/0161677 A1 | 6/2010 | Zurek et al. | |
| 2010/0251129 A1 | 9/2010 | Beringer et al. | |
| 2010/0313157 A1 | 12/2010 | Carlsson et al. | |
| 2010/0318200 A1 | 12/2010 | Foslien et al. | |
| 2011/0061013 A1 | 3/2011 | Bilicki et al. | |
| 2011/0113019 A1 | 5/2011 | Leff et al. | |
| 2011/0137917 A1 | 6/2011 | Boland et al. | |
| 2011/0145880 A1 | 6/2011 | Wang | |
| 2011/0173164 A1 | 7/2011 | Bendel et al. | |
| 2011/0173680 A1 | 7/2011 | Bates et al. | |
| 2011/0210986 A1 | 9/2011 | Goutsev et al. | |
| 2011/0214081 A1 | 9/2011 | Dobrin et al. | |
| 2011/0246925 A1 | 10/2011 | Marchand et al. | |
| 2011/0296311 A1 | 12/2011 | Dias et al. | |
| 2011/0302194 A1 | 12/2011 | Gonzalez et al. | |
| 2011/0314403 A1 | 12/2011 | Yan | |
| 2012/0041974 A1 | 2/2012 | Base et al. | |
| 2012/0089902 A1 | 4/2012 | Sheflin | |
| 2012/0166963 A1 | 6/2012 | Kohli et al. | |
| 2012/0179513 A1 | 7/2012 | Siklos et al. | |
| 2012/0180002 A1 | 7/2012 | Campbell et al. | |
| 2012/0180108 A1 | 7/2012 | Siklos et al. | |
| 2012/0249870 A1 | 10/2012 | Senster | |
| 2012/0254053 A1 | 10/2012 | Joa et al. | |
| 2013/0042190 A1 | 2/2013 | Ciloci | |
| 2013/0212085 A1 | 8/2013 | Nica et al. | |
| 2013/0246906 A1* | 9/2013 | Hamon | G06F 17/2252 715/234 |
| 2014/0082511 A1 | 3/2014 | Weissberg et al. | |
| 2014/0095966 A1* | 4/2014 | Burkard | G06F 17/30902 715/205 |
| 2014/0115009 A1 | 4/2014 | Lashley et al. | |
| 2014/0136298 A1 | 5/2014 | Marchand et al. | |
| 2015/0161550 A1 | 6/2015 | Siklos et al. | |

OTHER PUBLICATIONS

Prosecution Documents relating to U.S. Appl. No. 13/036,443 / Publication No. 2011/0214081 (1st Office Action, Response, 2nd Non-Final Office Action, Response, 3rd Made Final Office Action, Applicant's Interview Summary with Examiner, Response together with an After Final Consideration Program Request, Advisory Action dated Jun. 3, 2014, and Notice of Abandonment dated Sep. 23, 2014).

Prosecution Documents relating to U.S. Appl. No. 12/897,450 / Publication No. 2011/0210986 (1st Office Action, Response, 2nd Non-Final Office Action dated Dec. 24, 2013, and Notice of Abandonment dated Jul. 28, 2014).

Prosecution Documents relating to U.S. Appl. No. 12/897,550 / U.S. Pat. No. 8,683,370 (1st Office Action, Response, Notice of Allowance dated Sep. 3, 2013, Notice of Allowance dated Dec. 13, 2013 and Amendment after Notice of Allowance, together with an Issue Fee Payment and Issue Notification dated Mar. 5, 2014).

Prosecution Documents relating to U.S. Appl. No. 13/267,955 / Publication No. 2012/0089902 (1st Office Action, Response, 2nd Made Final Office Action, Applicant Initiated Interview Summaries, Response/RCE/IDS submission, 3rd Non-final Office Action, Response, 4th Made Final Office Action dated Apr. 22, 2015), Extension of Time.

Prosecution Documents relating to U.S. Appl. No. 13/082,512 / Publication No. 2012/0179513 (1st Office Action, Response, 2nd Made Final Office Action, Response, Advisory Action, Response/ RCE, 3rd Non-Final Office Action, Response, 4th Non-Final Office Action, Response and 5th Made Final Office Action dated Apr. 21, 2015), Extension of Time.

Prosecution Documents relating to U.S. Appl. No. 13/368,441 / Publication No. 2013/0042190 (Election Restriction, Response, 1st Non-Final Office Action, Response, 2nd Made Final Office Action, Response/RCE and 3rd Non-Final Office Action dated Jan. 14, 2015, Response), 4th Made Final Office Action.

(56) References Cited

OTHER PUBLICATIONS

Michael Calore "How Do Native Apps and We Apps Compare?" Aug. 19, 2010, available at http://web.archive.org/web/2000819203811/http://www.webmonkey.com/2010/08/how-do-native-apps-and-web-appscompare/.

Prosecution Documents relating to U.S. Appl. No. 13/082,556 / Publication No. 2012/0180108 (1st Office Action, Response, 2nd Made Final Office Action, Appeal Brief, 3rd Non-Final Office Action, Response, 4th Made Final Office Action dated Aug. 22, 2014 and Notice of Abandonment dated Apr. 20, 2015).

Document relating to U.S. Appl. No. 13/368,441 dated Oct. 20, 2015 (Final Office Action).

Document relating to U.S. Appl. No. 15/133,482 (Publication No. 20160232140), dated Jun. 28, 2018, pp. 1-17 (Office Action).

Document relating to U.S. Appl. No. 14/734,317/Publication No. 2015-0356137. dated Sep. 7, 2017 (Office Action).

Document relating to U.S. Appl. No. 15/606,901, dated Jan. 18, 2018 (Notice of Allowance and Notice of References Cited).

Document relating to U.S. Appl. No. 15/631,138/Publication No. US 2017-0351654. dated Nov. 8, 2017 (Office Action).

Microsoft "Serialization (C# and Visual Basic)," Oct. 16, 2015, available at https://web.archive.org/web/20110727023109/http://msdn.microsoft.com/en-us/library/ms233843.aspx.

Browne, Dean "IBM Cognos Business Intelligence VI0.1 Intelligence Unleashed", Oct. 12, 2010.

* cited by examiner

SYSTEMS AND METHODS FOR DASHBOARD IMAGE GENERATION

PRIORITY

This application is a continuation of U.S. patent application Ser. No. 13/267,955, filed Oct. 7, 2011, which claims the benefit of U.S. provisional patent application No. 61/390,642, filed Oct. 7, 2010. The entire contents of U.S. patent application Ser. No. 13/267,955 and U.S. provisional patent application No. 61/390,642 are hereby incorporated by reference.

TECHNICAL FIELD

The described embodiments relate generally to the creation and distribution of images of dashboards, with common but by no means exclusive application to the display of such images on mobile communication devices or other computer devices operatively coupled to the Internet.

BACKGROUND

"Dashboards" present visualizations, for example, in graph or chart form, of key performance indicator (KPI) metrics or information derived from business values or data stored in business databases. Such visualizations may be viewed (e.g., on a computer screen or other display device) by executives to obtain an overview of how a business is performing.

The inventors have recognized that it may be desirable to be able to view dashboard information on a computing device that is remote or otherwise separate from the server or system creating the dashboard. Such remote computing device may not have a software graphics platform. The inventors have recognized a need for improved systems and methods for generating and displaying images of dashboards. The embodiments described herein may address in whole or in part some or all of the above-noted challenges.

BRIEF DESCRIPTION OF THE DRAWINGS

Embodiments are described in further detail below, by way of example only, with reference to the accompanying drawings, in which.

DETAILED DESCRIPTION

Figure 1:
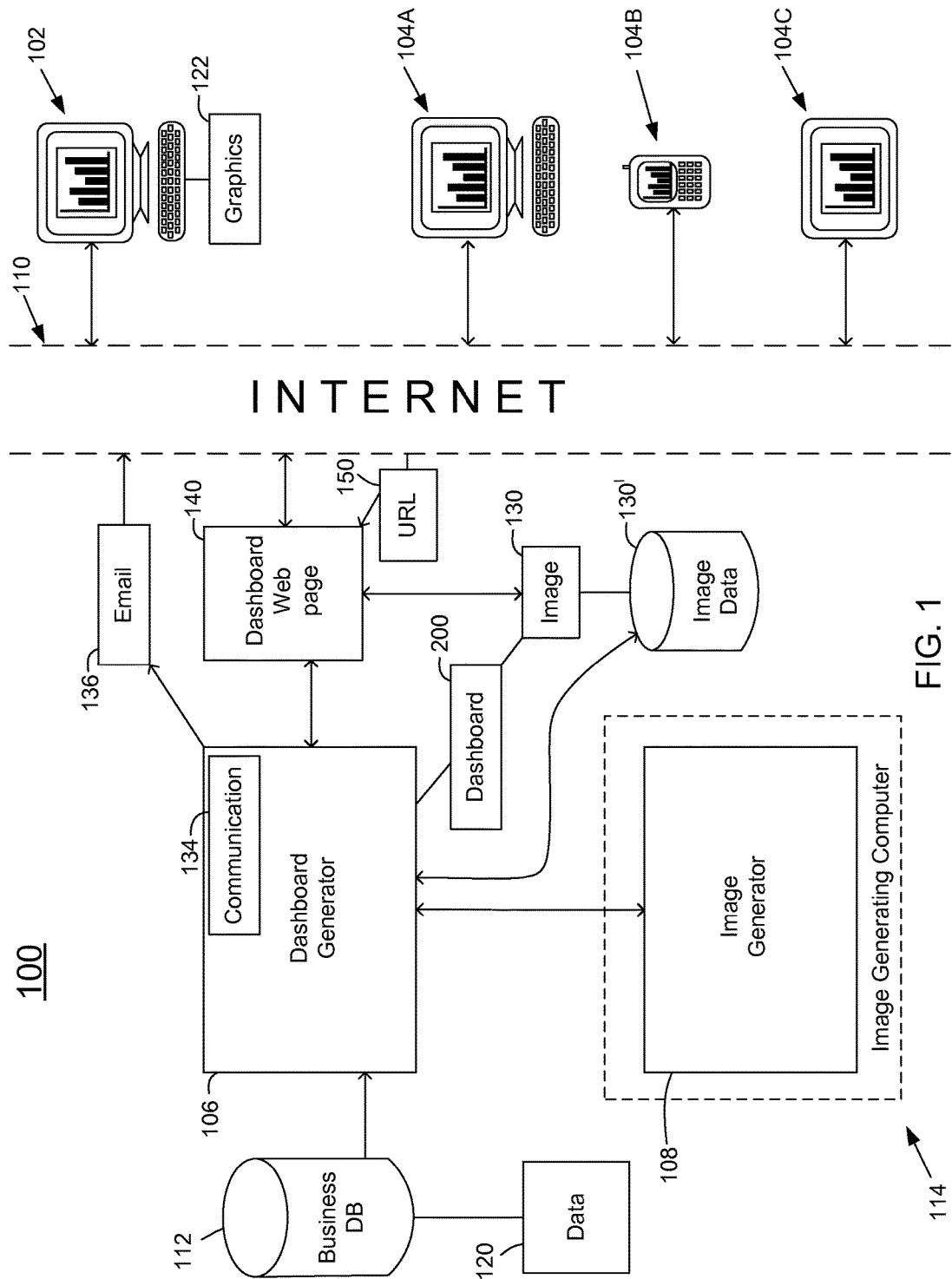
FIG. 1 is a schematic diagram of one implementation of a system for generating a dashboard image for viewing on a remote computing device, in accordance with the present disclosure.

The embodiments described below relate generally to a dashboard creation and management system that lets users view data visualization dashboards. Dashboards may display graphical elements that contain visual representations of key performance indicators for a business. KPIs may be business metrics that assist a business to better understand the data it has collected relating to the operation of the business. By way of example only, a dashboard created for a retail business might illustrate in graph form the business' retail sales over a period of time. Such exemplary dashboard might also illustrate in a pie chart the retail sales by product category (eg. clothing, shoes, sporting equipment) over the same (or a different) period of time. As will be understood, the nature of the KPIs displayed will vary based on the nature of the business and the needs of the individual wishing to view and understand different business metrics.

For the purposes of the present disclosure such a dashboard creation and management system may typically include two types of dashboard viewing users (who are often business executives): those who are able to view and interact with a dashboard (referred to generally below as "interactive viewers"), and those who are only able to view a static image of a dashboard, without being able to interact directly with the dashboard (referred to below generally as "remote viewers").

Dashboards may be designed to be interactive in a number of different ways. For example, an interactive viewer may be able to configure the date ranges to be used for filtering the business data which is to be represented in the KPIs on the dashboard. Some dashboards may be configured to allow different categories of business data to be represented in the KPIs, such as product types sold or sales by selected stores. Any particular dashboard may provide a variety of interaction options appropriate for the application.

As will be understood, the software required to interact with a dashboard (which would typically be installed on a business' office computers) may not be available on all computing devices to which an executive has access (for example, a smartphone, a tablet, or a personal computer which has not been configured with the necessary software). While away from the fully configured computers available at a business' office, an executive may still desire to view a dashboard, even if interactive functionality is not available.

One aspect of the technology described herein relates to a method for generating a dashboard image for viewing on a remote computing device. The method may include: receiving a dashboard image request from the remote computing device; deriving a plurality of key performance indicator values from a business database; creating a dashboard image corresponding to the key performance indicator values; and generating a dashboard web page corresponding to the dashboard image.

In some implementations, the dashboard web page may be accessed by the remote computing device. As well, the dashboard image request may be communicated via the Internet. In some instances, the dashboard image request corresponds to a dashboard URL. In turn, the dashboard web page may also correspond to or be accessed via the dashboard URL.

The method may also include communicating a message corresponding to the dashboard image request to the remote computing device. The message may be communicated via the Internet. In some instances, the message includes the dashboard image. In addition or in the alternative, the message may include a dashboard URL or other storage address for locating the dashboard image.

The dashboard image may be created on an image creating computer, wherein the remote computing device is remote or otherwise separate from the image creating computer.

As well, in some implementations, the dashboard image request comprises at least one parameter and the dashboard image corresponds to the at least one parameter.

One aspect of the technology described herein relates to a system for generating a dashboard image for viewing on a remote computing device. The system may include a business database storing a plurality of business values; a dashboard generator; an image generator and a web page generator. The dashboard generator may be configured to derive a plurality of key performance indicator values from the business database and generate a dashboard corresponding to the plurality of key performance indicator values. The image generator may be configured to generate the dashboard image, such that the dashboard image corresponds to the dashboard. As well, the web page generator may be operatively coupled to the image generator and configured to generate a dashboard web page corresponding to the dashboard image.

In some implementations, the web page generator may be operatively coupled to the dashboard generator. Alternatively, the web page generator may form part of the dashboard generator. The web page may be configured to receive a dashboard image request from the remote computing device. Such a dashboard image request may be communicated via the Internet. Sometimes, the dashboard image request corresponds to a URL. The dashboard web page may correspond to the URL. For some configurations, the dashboard image request includes at least one parameter and the dashboard image corresponds to the at least one parameter.

In some implementations, the dashboard generator is configured to communicate a message corresponding to the dashboard image request to the remote computing device. The message may be communicated via the Internet. As well, the message may include the dashboard image.

In some implementations, the image generator comprises an image creating computer and wherein the remote computing device is remote or otherwise separate from the image creating computer.

Referring to FIG. 1, illustrated there is a block diagram of one possible embodiment of a system for generating a dashboard image for viewing (on a remote computing device), shown generally as 100. The system 100 may include one or more fully enabled client terminals 102, one or more remote terminals or computing devices 104A, 104B, 104C, a server-side dashboard generator module 106 and an image generator 108. Each of these components may be networked (in addition to being coupled to the Internet 110) and be operable to communicate with each other. While connectivity is described herein throughout in relation to the Internet 110, it should be understood that other types of networks, such as a local area network (LAN) may be used. Without intending to be limiting, the remote computing devices may, for example, be in the form of a personal computer 104A, a smartphone 140B, or a tablet 104C configured with a web browser. The remote computing devices 104A, 104B, 104C will also typically be configured with an email reader.

Further, while the generator module 106 and image generator 108 are illustrated as being separate components, it should be understood that in some implementations, the image generator 108 may be considered to comprise part of the dashboard generator module 106 and/or reside on the same server/computer. The system 100 may also include a business database 112. A business data server (not shown) may also be provided which executes software components that provide access to the business database 112.

As will be discussed in greater detail below, the business database 112 may store business data 120 corresponding to a plurality of business values (e.g., sales, expenses, inventory or human resources data) that relate to the operation of a business. As an illustration, the business database 112 may be an accounting and inventory management database that stores transactional data for a sporting goods store. In some embodiments, the business database 112 may be stored on a separate computer or server accessible by the dashboard generator 106.

As will be understood, all or a subset of business values may be selected from the business database 112 for the purpose of deriving (or calculating) KPI values for visualization on the dashboard to be generated. For example, the KPI values may be derived by performing a summation or other mathematical process on the business values.

Figure 2:
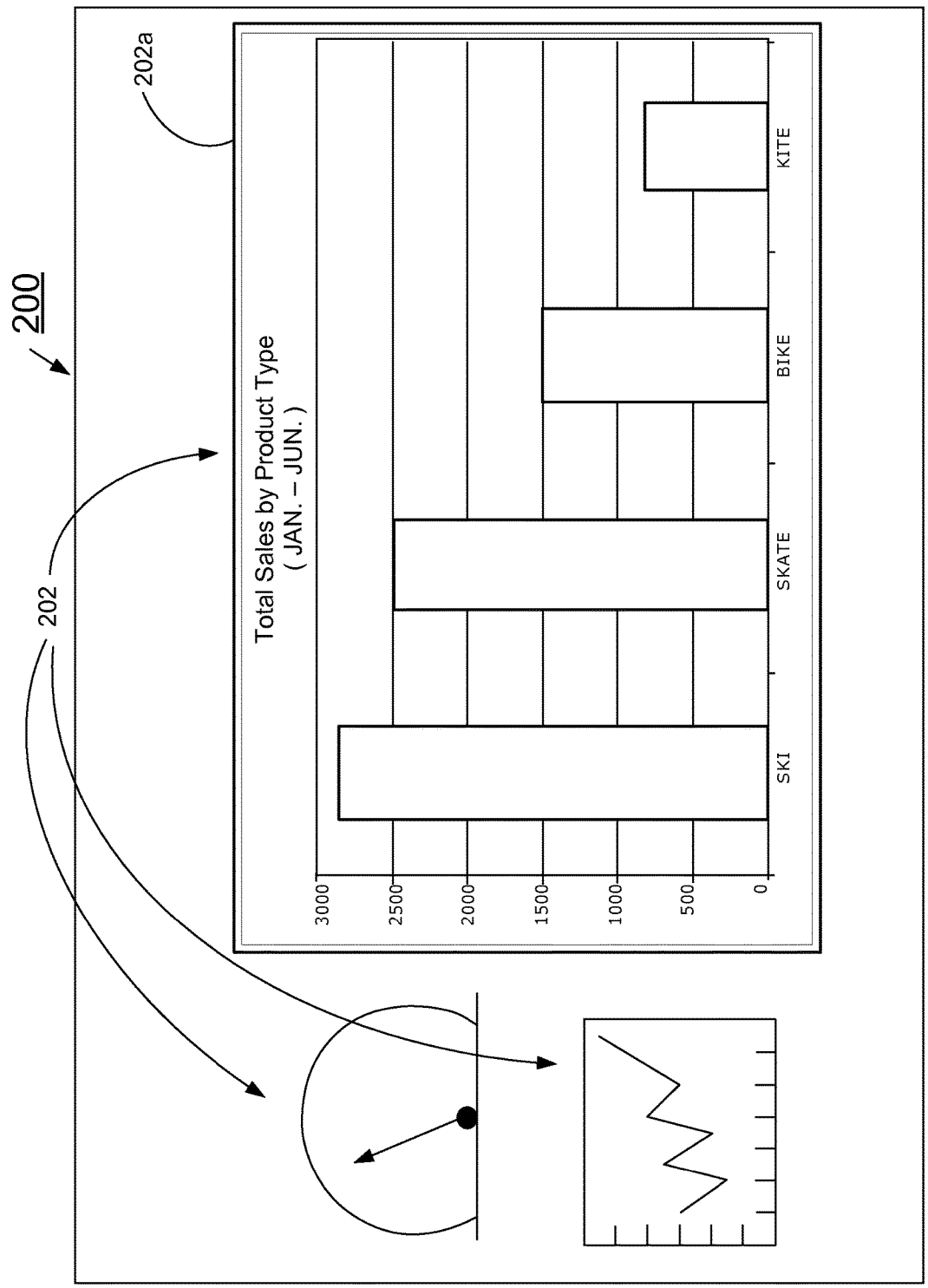
FIG. 2 is a schematic illustration of an exemplary dashboard, as may be generated in accordance with the present disclosure.

Referring briefly to FIG. 2, shown there is an example dashboard 200 showing various different graphical KPI visualizations 202. One exemplary type of KPI visualization illustrated in the dashboard 200 is the 'Total Sales by Product Type' KPI 202a, depicting bar graph data corresponding to sales of specified products over a period of time.

Referring again to FIG. 1, exemplary client terminals 102, remote computing devices 104A, 104B, 104C, dashboard generator module 106 and image generator 108 may comprise a number of components (which have not all been illustrated), including microprocessors. In the exemplary configuration illustrated in FIG. 1, the microprocessor (which may be in the form of a server, for example) on which the software of the image generator 108 is run is referred to herein as the image creating computer 114. As noted above, this microprocessor 114 may be the same as or different from the microprocessor(s) (which may be in the form of one or more servers, for example) on which the software of the dashboard generator module 106 runs.

Microprocessors typically control the overall operation of computer systems. Microprocessors interact with additional computer subcomponents such as memory storage (which may include random access memory (RAM) and read-only memory (ROM), and persistent storage such as flash memory), display, network adapter and input device(s), for example, such as a keyboard, mouse, touchscreen (which may form part of the display) or touchpad. Network adapters allow connection to different types of networks (for example, Local Area Networks (LANs) as well as Wide Area Networks (WANs)), and may be wired (for example, through an Ethernet connection) or wireless (for example, through 802.11 Wireless Local Area Network (WLAN) or cellular standards). Operating system software used by a microprocessor is typically stored in a persistent store such as flash memory or read-only memory (ROM) or similar storage. Those skilled in the art will appreciate that the operating system, specific software components, or parts thereof, may be temporarily loaded into a volatile store such as RAM. Microprocessors, in addition to operating system functions, enable execution of software components.

In the exemplary embodiment in FIG. 1, it should be understood that the computers/microprocessors of the remote terminals or computing devices 104A, 104B, 104C are separate from the image generating computer 114. Reference herein to "remote" computing devices 104A, 104B, 104C is intended to convey that such computing devices 104A, 104B, 104C are distinct, different and/or separate from (and do not form part of) the image creating computer 114—in this context, "remote" is not intended to refer to geographical distance.

From a high level perspective, the dashboard generation module 106 provides interactive dashboard functionality and visualization for interactive viewers on the fully enabled client terminal 102. While not illustrated, it will be understood that more than one client terminals 102 may access (simultaneously or otherwise) the interactive dashboard functionality provided by dashboard generation module 106. In contrast, users may be able to view a static image of a dashboard (such as dashboard 200) on the remote computing device(s) 104A, 104B, 104C via a web page. The dashboard URL (uniform resource locator) 150 address corresponding to the dashboard web page 140 is communicated to the remote computing device(s) 104A, 104B, 104C typically via the Internet, such as via email. As will be discussed in greater detail, below, the static dashboard image 130 is generated by the image generator 108 upon request from the dashboard generation module 106.

As noted above, the business database 112 may store business data 120. Such business data 120 may correspond to any data stored by a business organization in relation to the operation of its business. For example, this may include transactional sales data or inventory data. The dashboard generation module 106 may include a dashboard creation and management system for creating and managing executive business dashboards (such as exemplary dashboard 200 illustrated in FIG. 2) that show business metrics, typically in a graphical format. As noted above, such business metrics for the dashboard creation and management system may be derived from the business data 120.

Dashboard generation module 106 may select certain business data 120, generate corresponding KPIs and organize/present the KPIs in a dashboard 200 for interactive viewing by business executives using a client terminal 102 (for example, which may be in the form of a desktop or notebook PC). Such terminal 102 may be equipped with a graphics platform 122 such as Microsoft® Silverlight™ or Windows Presentation Foundation™ (WPF). Specifically, the user may use a desktop software application (e.g., equipped with WPF) or a web browser (e.g., equipped with Silverlight™) available on terminal 102 to select and interactively view a dashboard 200 of interest.

A request to view a dashboard 200 may be made from the terminal 102 to the dashboard generation module 106. The dashboard generator 106 returns data which consists of information needed by the graphics platform 122 to render the desired dashboard 200 on the display of computer 102. In this way, the client terminal 102 may be considered a client computer in the client-server software architecture known in the art.

As will be understood, the dashboard generation module 106 may further be configured to request that the image generator 108 create a snapshot image 130 of a specified dashboard. By "specified", it is meant that various parameters defining the type of data and the display preferences of the dashboard are determined by the dashboard generation module 106 (often as a result of input from the user of the terminal 102). As will be understood in the context of the following discussion, the dashboard generation module 106 may be configured to create a dashboard URL 150 corresponding to the desired dashboard 200 and its preferences.

Referring again briefly to FIG. 2, by way of example only, preferences determined for the dashboard 200 may include the products to be included in the "Total Sales by Product Type" KPI 202a (eg. "Ski", "Skate", "Bike", "Kite"), the date range of the data to be displayed (January to June), as well as the choice to illustrate the data in a bar graph format. As will be understood, other types of preferences may be determined in order to specify the KPIs to be determined and displayed, as well as the configuration of the dashboard 200. Once the dashboard image snapshot 130 is created, the image generation system 108 returns the generated dashboard image data back to the dashboard generator module 106. The dashboard image 130 may also be saved or cached as a dashboard image data file 130'. Instead of returning an on-demand image, the dashboard generator 106 may be configured to return a cached image created during a previous request. Such caching can help with performance efficiency and protect against denial-of-service attacks.

Referring again to FIG. 1, the generation module 106 may include a communication module 134 configured to include the dashboard image 130 in an email message 136 by attaching the image data 130' as a PNG (portable network graphics) file. As will be understood, a PNG file is typically viewable by a standard web browser and a standard email reader. As will be understood, while the PNG image format is described herein throughout, other appropriate image formats (for example without limitation, JPEG (Joint Photographic Experts Group)) may also be used. In addition, or in the alternative, this email message 136 may include the dashboard URL 150 corresponding to the desired dashboard 200. Such email message 136 may then be communicated to a remote computing device 104A, 104B, 104C.

The generator 106 may also be configured to host an Internet web page 140 that shows the generated dashboard image 130. This dashboard web page 140 is accessible to a remote computing device(s) 104A, 104B, 104C which has been configured with a web browser and is coupled to the Internet 110. As noted above, the remote computing device 104A, 104B, 104C may be provided with the dashboard URL 150 from receipt of the email message 136. Once in possession of the dashboard URL 150, as will be understood, a remote computing device 104A, 104B, 104C may access the dashboard web page 140 via the Internet 110.

Typically, the web page 140 would comprise basic HTML coding in addition to the image data 130' and be viewable by a standard web browser—as a result, no specialized graphics platform (similar to the graphics platform 122 the client terminal 102 may be equipped with) which would otherwise be required for viewing the image 130, is possessed by such remote computing device(s) 104A, 104B, 104C.

As previously noted, the request and corresponding generation of a dashboard image 130 by the dashboard generator module 106 may be automatic (and/or periodic) or on-demand as a result of access to the web page 140 such as by remote computing device(s) 104A, 104B, 104C.

Figure 3:
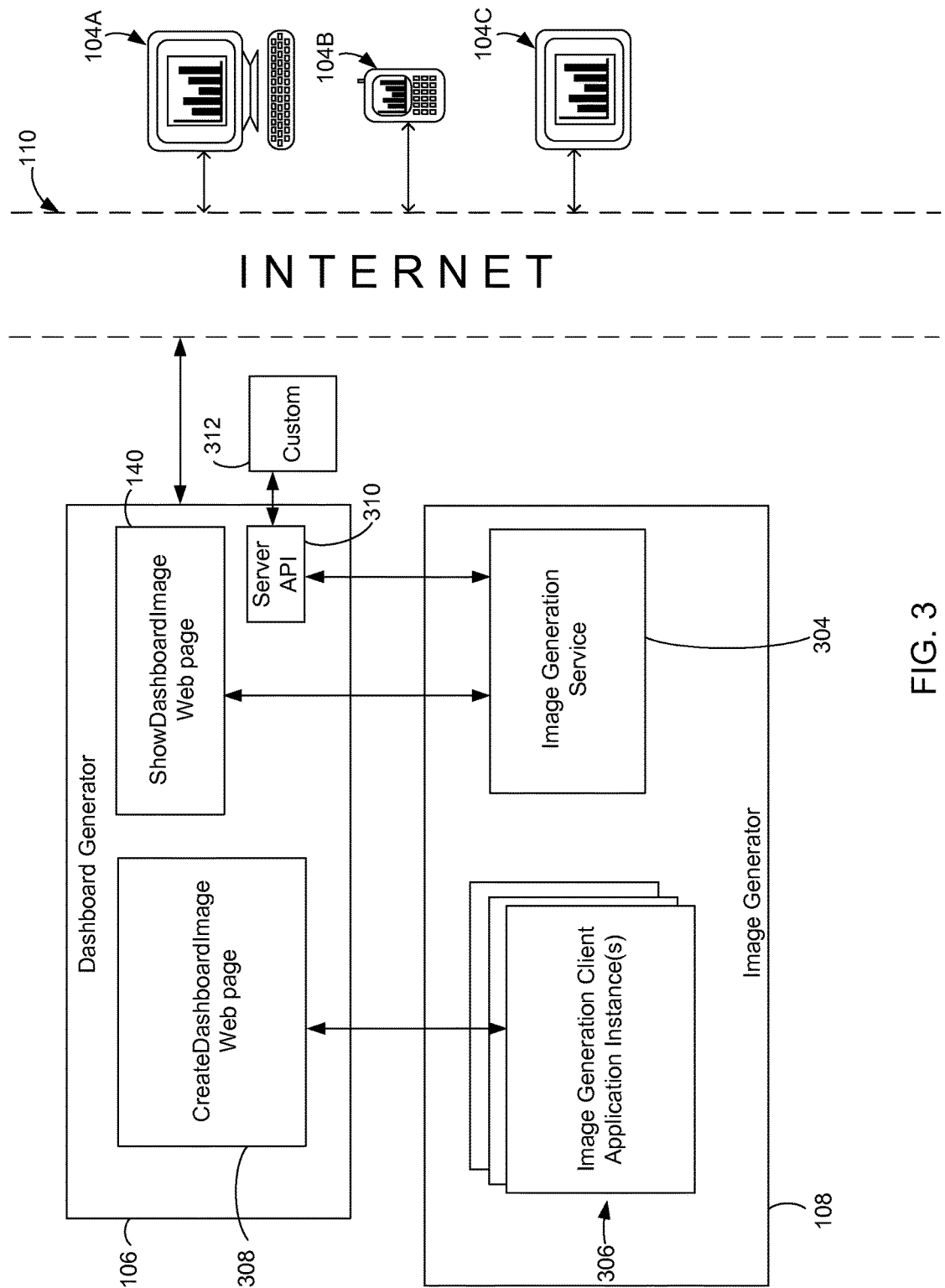
FIG. 3 is a schematic illustration of the internal components of the dashboard generator and the image generator of FIG. 1 shown in greater detail, in accordance with the present disclosure.
Figure 4:
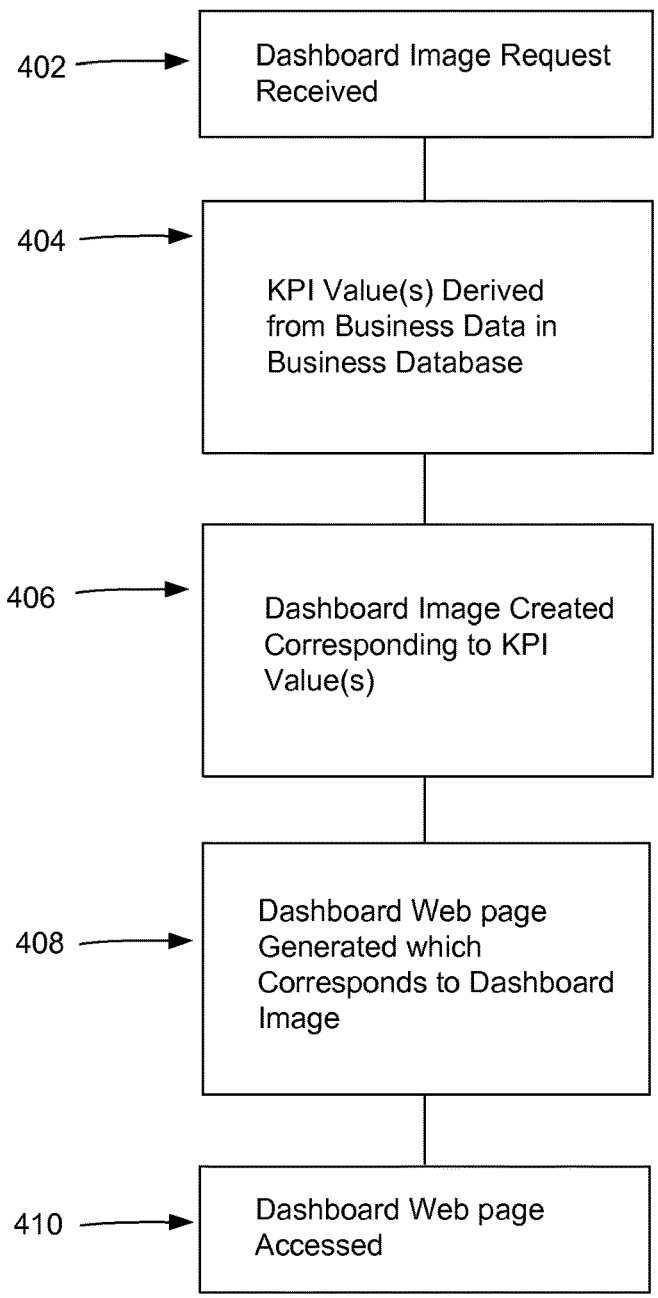
FIG. 4 is a flowchart illustrating the steps in a method for generating a dashboard image for viewing on a remote computing device, in accordance with the present disclosure.

Referring simultaneously to FIGS. 3 and 4, exemplary methodology and component configuration are discussed. FIG. 3 illustrates the internal components of the dashboard generator 106 and the image generator 108 and their interaction with other components of the system 100 in greater detail as may be implemented in accordance with the present disclosure. FIG. 4 is a schematic diagram of a method, shown generally as 400, for generating a dashboard image for viewing on a remote computing device, in accordance with one or more possible embodiments.

The "on-demand" generation of a dashboard image 130 may be initiated by a computer, such as a remote computing device 104A, 104B, 104C navigating to the dashboard image web page 140, sometimes referred to herein as the "ShowDashboardImage" web page (and which may be hosted by, and forms part of, the dashboard generator 106) at the corresponding URL in order to generate a request to view a specific dashboard as an image. A dashboard image request is received by the dashboard generation module 106 from the remote computing device 104A, 104B, 104C accessing the dashboard image web page 140. (Block 402)

As noted above, various parameters defining the type of data and the display preferences of the dashboard 200 may be specified within the dashboard URL 150 corresponding to the dashboard web page 140. Such parameters may be communicated to the generation module 106 via URL query parameters. By way of further example, such parameters may include the information needed to identify the dashboard (such as its GUID (Globally Unique Identifier) and the state of its filters (if any), which are passed in to the web page 140. An example URL comprising such parameters contained within the URL might look like the following: "http://dashsvr/ShowDashboardImage.aspx?param1=xx&param2=yy& . . . ", with "xx" and "yy" representing dummy values for exemplary parameters represented by "param1" and "param2", respectively.

The ShowDashboardImage web page 140 may communicate a corresponding request to the image generation service 304 (which forms part of the image generator 108) to create an image 130 of the specified dashboard 200. The image generation service 304 has a specific service URL that is recorded as part of the dashboard generation module's 106 configuration file. This is how the dashboard image web page 140 knows where to direct its request. By way of example, a service URL might look as follows: "http://imgsvr:8888/ImageCreationWebService/service".

In response to receiving the request, the image generation service 304 may launch a new instance of an image generation client application 306 (also forming part of the image generator 108), or re-use an existing but idle instance. The client application instances 306 may be pooled on the image generating server computer 114 to allow for instance re-use. This may provide performance efficiency because there is a significant startup-time cost involved in launching a new instance of client application 306 (which may be on the order of several seconds). The image generation service 304 may also be configured to use the pool to handle multiple parallel or simultaneous requests. For example, if five requests come in at the same time, and the pool includes at least five idle client application instances 306, then all five requests will become active in parallel. If the pool of instances 306 is less than five, then one (or more) requests will have to wait until another has finished.

The client application 306 may be in the form of a Windows™ Forms program that incorporates a web browser control which allows it to navigate to and view web pages. The corresponding web browser/image generating server computer 114 is configured with the graphics platforms installed (such as Silverlight) which will allow it to display actual dashboards made available by the dashboard generation module 106. The client application 306 enables the creation of a snapshot image of the dashboard.

The image generator 108 may also be provided with its own configuration file, where one of the configuration parameters is the base URL of the dashboard generator 106. Using this base URL, the full URL of the CreateDashboardImage web page 308 managed by the dashboard generator 106 can be determined. When the client application 306 is launched (or re-used), it navigates to this CreateDashboardImage URL, and passes in query parameters as necessary to identify the dashboard 200 to be viewed and its state. For example, the URL to access and pass in the query parameters might read as follows: "http://dashsvr/CreateDashboardImage.aspx?param1=xx&param2=yy& . . . " In terms of the implementation, it is worth noting that the client application 306 may run in an unattended mode, without any user physically operating the application 306. The image generator 108 incorporates Win32™ API (Application Program Interface) functions) to cause the application 306 to render the dashboard image.

Upon receiving the query parameters necessary to identify and/or generate the desired dashboard 200, the CreateDashboardImage web page 308 is configured to access the business database 112 and derive one or more KPI values from the business data 120. (Block 404)

When the image generation client application 306 has finished determining or rendering the dashboard 200 (corresponding to the query parameters), it creates a snapshot image 130 of it (by using graphics platform API functions— e.g., Silverlight™ API which may be incorporated within or otherwise accessible by the CreateDashboardImage web page 308 coding). (Block 406) As will be understood, the snapshot image 130 corresponds to or otherwise displays the derived KPI value(s).

The client application 306 may then communicate the generated image data 130' back to the dashboard generator 106 (via HTML POST of the actual image data 130' encoded as a base64 string to the CreateDashboardImage webpage/URL 308). The dashboard generator 106 may save the received image data 130' in the form of a temporary PNG file on its server computer (e.g., on its hard drive). The dashboard generator 106 then returns back to the client application 306 the image information necessary to access/locate the image file 130' (or it returns some error information if an error occurred).

The image information may simply be an image identifier (which, for example, may be a random number between 300 and 30000) which is used to construct the name of the temporary image file 130' (e.g., "300.png"). Other alternative implementations could involve returning an image identifier (GUID), or the actual file path of the image file 130' on the dashboard generator server computer.

In turn, the client application 306 returns the image (or error) information back to the image generation service 304. The image generation service 304 may then return the image (or error) information back to the ShowDashboardImage web page 140.

The ShowDashboardImage web page 140 uses the returned image information to locate the actual temporary PNG image file on the dashboard generator server computer. The image data 130' may be read from this image file and the image file may be deleted from the dashboard generator server computer hard drive.

The resulting ShowDashboardImage web page 140 incorporates the image data 130' inline for display of the dashboard image 130. (Block 408) This allows the requesting device, such as a remote computing device 104A, 104B, 104C, to access the dashboard web page 140 and view the dashboard image 130 in a web browser. (Block 410)

Figure 5:
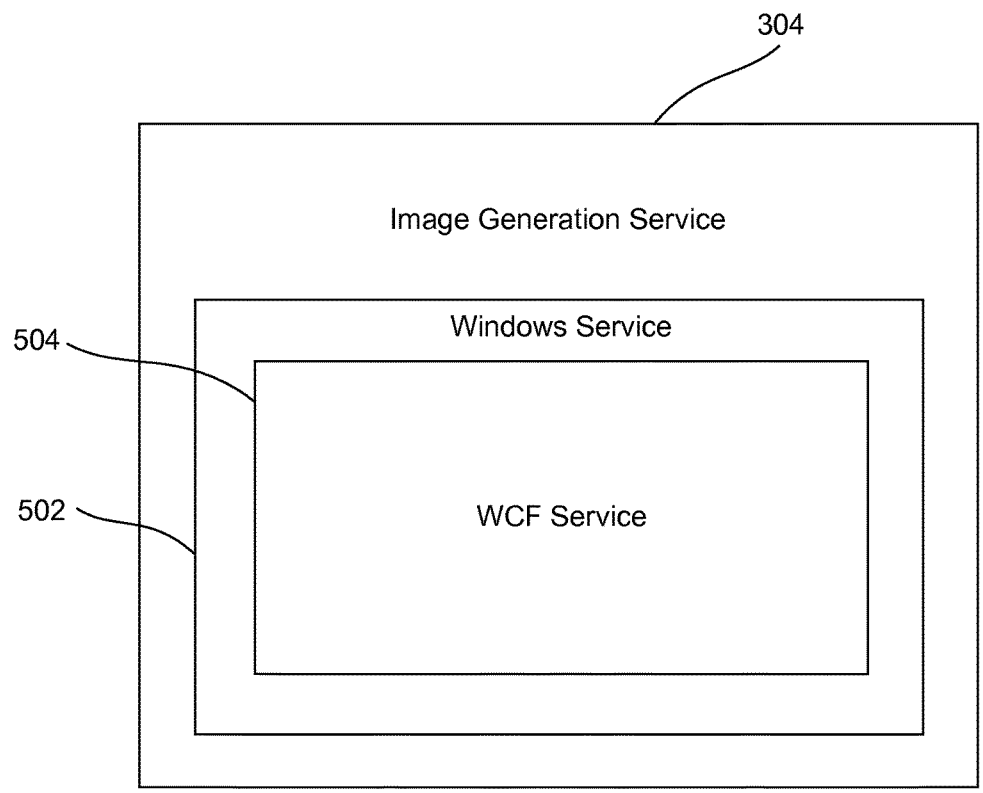
FIG. 5 is a schematic illustration of the internal components of the image generation service of FIG. 3 shown in greater detail, in accordance with the present disclosure.

Turning briefly to FIG. 5, illustrated therein is a schematic diagram of the internal components of the image generation service 304 in greater detail as may be implemented in accordance with the present disclosure. The image generation service 304 may include a Windows™ service 502 which provides the housing for a WCF (Windows Communication Foundation) service 504. The Windows service 502 merely provides the housing that allows the image generation service 304 to run unattended on the image generation server computer. This Windows service 502 must be run under the context of a user account that has administrative privileges on the image generation server computer 114. The use of a Windows service 502 also allows for the automated scheduling of dashboard image requests on a periodic basis.

The WCF service 504 handles communication with the dashboard generator 106 and manages the pool of client application instances 306. It also receives dashboard image requests (for example, from the ShowDashboardImage web page 140) and returns image information back to the dashboard generator 106.

Figure 6:
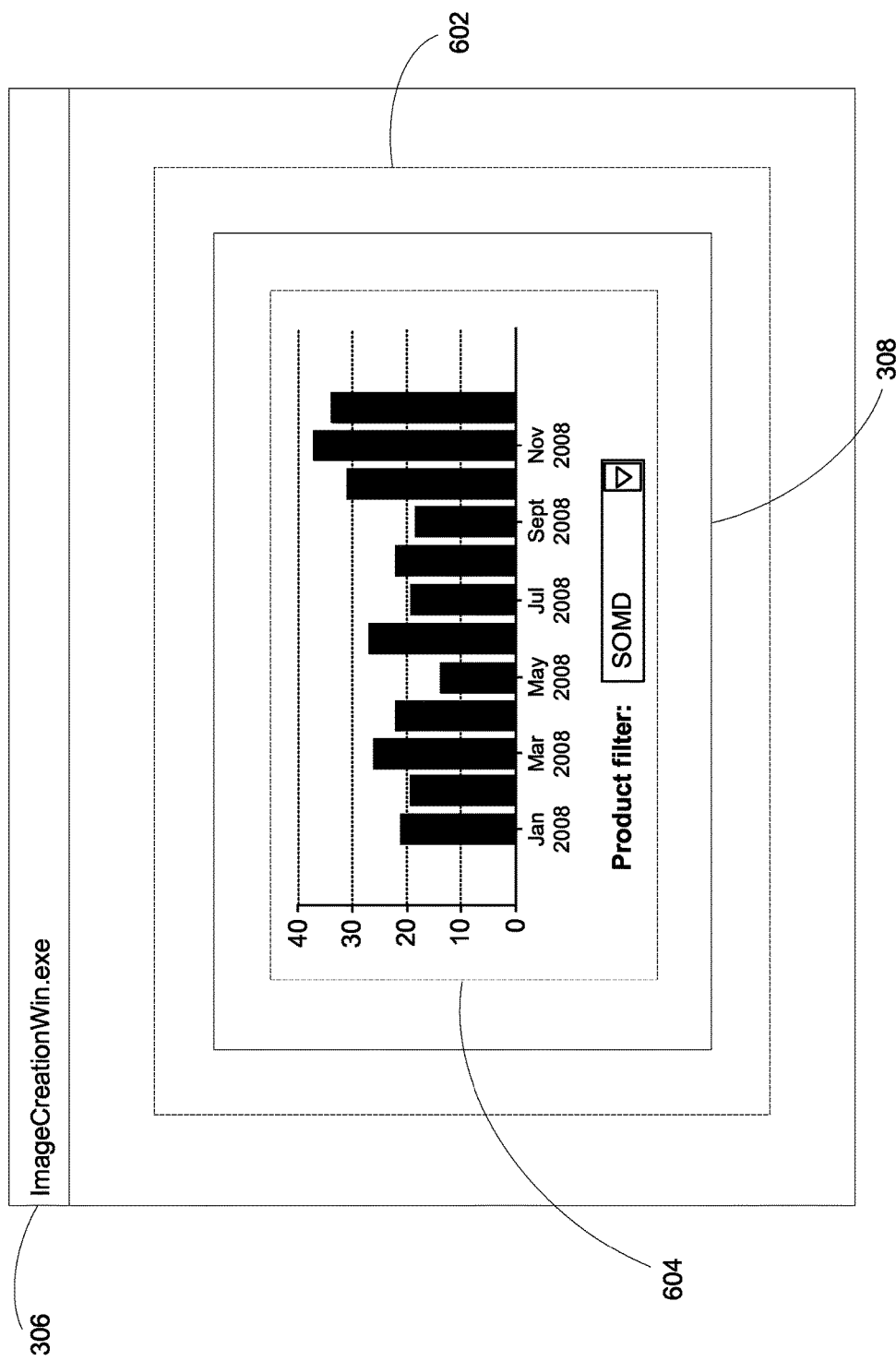
FIG. 6 is a schematic illustration of the internal components of the image generation client application and CreateDashboardImage web page of FIG. 3 shown in greater detail, in accordance with the present disclosure.

Turning briefly to FIG. 6, illustrated therein is a schematic diagram of the internal components of the image generation client application 306 and CreateDashboardImage web page 308 in greater detail as may be implemented in accordance with the present disclosure. In some implementations, client application 306 may be a Windows Forms application program (eg. ImageCreationWin.exe). In the example embodiment, the client application 306 contains an embedded web browser control 602 configured to enable the loading and displaying of web pages. The web browser control 602 may be Silverlight-capable. The CreateDashboardImage web page 308 may be loaded into the web browser control 602. The web page 308 is configured to display an interactive, Silverlight-based dashboard 604.

Referring again to FIG. 3, in addition or in the alternative to the "on-demand" configuration and methodology for generation of a dashboard image 130 described above, the system 100 may be configured with an "API" pipeline which is similar to the "on-demand" configuration and methodology. In this case, a custom server application or add-on module 312 uses the dashboard generator's 106 public server API 310 to create a dashboard image 130. Specifically, the custom server code 312 may call a "GetDashboardImage" server API function which initiates a dashboard image request in a similar fashion as the on-demand pipeline process noted above. As a result of such request, the generated image data 130' is returned to the custom server application 312. The inclusion of such an API pipeline allows third-party developers to create server extensions that make use of dashboard images 130.

As discussed above, to view a dashboard image, a remote device such as remote computing devices 104A, 104B, 104C needs to navigate to a specific URL hosted by the dashboard generator 106 and pass in URL query parameters to specify the dashboard and its desired state (e.g. what values are the date and/or product filters set to, etc). For example, the query parameters may include the dashboard's GUID identifier, whether a timestamp should be embedded in the dashboard image, and other options, etc. For illustration purposes only, such a URL might appear as follows: "http://dashsvr/ShowDashboardImage.aspx?param1=xx&param2=yy& . . . ".

This dashboard URL 150 which corresponds to the dashboard 200 can be determined by an interactive viewer using a client computer 102. Such interactive viewer may view an actual interactive dashboard and set up the filters and dashboard parameters as desired. The dashboard generator 106 may be configured to enable the generation of a dashboard URL 150 corresponding to the dashboard 130 and filters/parameters as determined by the interactive viewer on the client computer 102. Once it has been determined, the dashboard URL 150 may be communicated to one or more of the remote computing devices 104A, 104B, 104C typically via the Internet 110 such as through an email. As noted previously, when such a (notification) email is sent, the email may include an on-demand URL link and/or an actual PNG image attachment. Emails can be sent under different scenarios (e.g., the dashboard generator 106 can be configured to send such an email when KPI values change state, on a periodic/scheduled basis, or when an interactive viewer annotates data on a dashboard). If the dashboard generator 106 is configured to send emails periodically, and dashboard image data 130' is included with the email as an attachment, then the sequence of emails serves as a history of dashboard images 130.

As a further convenience, the dashboard URL query parameters can effectively be saved by the dashboard generator 106 into its internal database or by the browser on the remote computing device(s) 104A, 104B, 104C in the form of a "bookmark". The saved bookmark may have its own identifier (GUID) which allows end-users/remote viewers to recall the bookmark (and view the corresponding dashboard image 130) simply by referencing its identifier. In this case, there is no need to supply the full set of URL query parameters because they are recalled automatically from the database.

An example of a shorter and simpler URL for viewing a dashboard image with the timestamp option enabled might look as follows: "http://dashsvr/ShowDashboardImage.aspx?BookmarkId=8f1e2234-1522-4366-bbf5-53fcc16b987f&isTimeStampShown=1".

It will be understood that while the term databases are illustrated and used in the present disclosure, any suitable method of persistent storage (e.g., a fixed format file system) may be used in the role of the illustrated databases. It will also be understood by a person skilled in the art that data and/or databases illustrated and/or described separately herein can be stored together as separate files or data elements within the same or multiple databases both locally and/or remotely.

It will also be understood that other system arrangements and configurations may be possible. It will be understood by persons skilled in the art that variations are possible in variant implementations and embodiments. Such variations include, but are not limited to, variations in the connectivity amongst described components, the sequence of execution by described components and the organization of described components.

The steps of a method in accordance with any of the embodiments described herein may be provided as executable software instructions stored on computer-readable media, which may include transmission-type media. Such steps may not be required to be performed in any particular order, whether or not such steps are described in claims or otherwise in numbered or lettered paragraphs.

The invention has been described with regard to a number of embodiments. However, it will be understood by persons skilled in the art that other variants and modifications may be made without departing from the scope of the invention as defined in the claims appended hereto.

The invention claimed is:

1. A method for generating a static image of an interactive dashboard for viewing on a remote computing device, the method comprising:
  receiving a dashboard request, the dashboard request comprising data identifying the interactive dashboard and data specifying a state for one or more dashboard filters to be applied to the interactive dashboard;

in response to receiving the dashboard request:
: transmitting, to an image generator, a dashboard image request corresponding to the dashboard request, the image generator comprising an image generation service and an instance of an image generation client application; and
: receiving, from the instance of the image generation client application, at least one query parameter corresponding to the dashboard image request;
: in response to receiving the at least one query parameter:
:: deriving one or more key performance indicator values from business data stored in a business database; and
:: transmitting the one or more key performance indicator values to the instance of the image generation client application, the instance of the image generation client application rendering the interactive dashboard and generating an image data file comprising a static image of the rendered interactive dashboard in response to receipt of the one or more key performance indicator value;
: receiving, from the instance of the image generation client application, the image data file comprising the static image of the interactive dashboard; and
: transmitting the image data file to the remote computing device.

2. The method of claim 1, wherein the image data file is transmitted to the remote computing device via an email message.

3. The method of claim 2, wherein the image data file is transmitted to the remote computing device in response to a determination that one of the one or more key performance indicator values has changed state.

4. The method of claim 2, wherein the image data file is transmitted to the remote computing device in response to a determination that data corresponding to one of the one or more key performance indicator values has been annotated.

5. The method of claim 2, wherein the image data file is transmitted to the remote computing device on a periodic basis.

6. The method of claim 1, wherein the static image comprises an embedded timestamp.

7. The method of claim 1, wherein the data identifying the interactive dashboard comprises a globally unique identifier associated with the interactive dashboard.

8. The method of claim 1, wherein the dashboard request comprises a uniform resource locator (URL).

9. The method of claim 1, wherein the dashboard request is received from the remote computing device.

10. The method of claim 1, wherein the dashboard request is received at a first server computer, and the image generator is located at a second server computer.

11. A first computing device comprising a processor and a memory, the processor configured to execute instructions of one or more application modules, the execution of the one or more application modules causing the processor to:
: receive a dashboard request, the dashboard request comprising data identifying an interactive dashboard and data specifying a state for one or more dashboard filters to be applied to the interactive dashboard;
: in response to receiving the dashboard request:
:: transmit, to an image generator, a dashboard image request corresponding to the dashboard request, the image generator comprising an image generation service and an instance of an image generation client application;
:: receive, from the instance of the image generation client application, at least one query parameter corresponding to the dashboard image request;
:: in response to receiving the at least one query parameter:
::: derive one or more key performance indicator values from business data stored in a business database; and
::: transmit the one or more key performance indicator values to the instance of the image generation client application, the instance of the image generation client application rendering the interactive dashboard and generating an image data file comprising a static image of the rendered interactive dashboard in response to receipt of the one or more key performance indicator values;
:: receive, from the instance of the image generation client application, the image data file comprising the static image of the interactive dashboard; and
:: transmit the image data file to a first remote computing device.

12. The first computing device of claim 11, wherein the image data file is transmitted to the remote computing device via an email message.

13. The first computing device of claim 12, wherein the execution of the one or more application modules further causes the processor to transmit the image data file to the first remote computing device in response to a determination that one of the one or more key performance indicator values has changed state.

14. The first computing device of claim 12, wherein the execution of the one or more application modules further causes the processor to transmit the image data file to the first remote computing device in response to a determination that data corresponding to one of the one or more key performance indicator values has been annotated.

15. The first computing device of claim 12, wherein the execution of the one or more application modules further causes the processor to transmit the image data file to the first remote computing device on a periodic basis.

16. The first computing device of claim 11, wherein the static image comprises an embedded timestamp.

17. The first computing device of claim 11, wherein the data identifying the interactive dashboard comprises a globally unique identifier associated with the interactive dashboard.

18. The first computing device of claim 11, wherein the dashboard request comprises a uniform resource locator (URL).

19. The first computing device of claim 11, wherein the dashboard request is received from a second remote computing device.

* * * * *